Dec. 7, 1965     F. W. LINDBLAD     3,221,728
CIRCULAR SAW
Filed Feb. 19, 1963
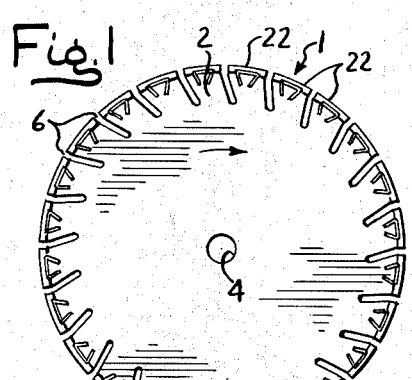
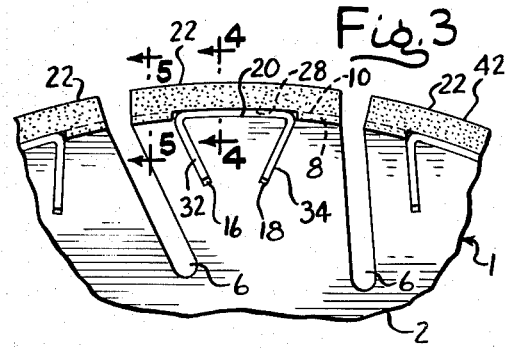
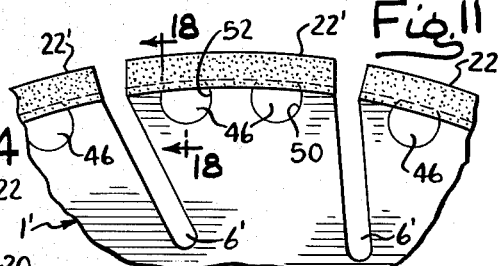
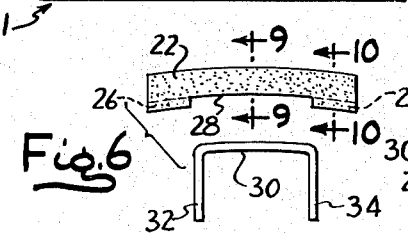
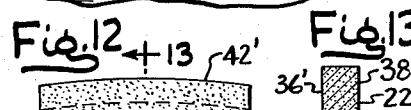
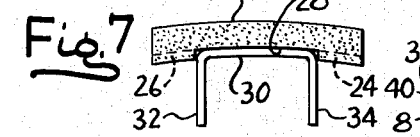
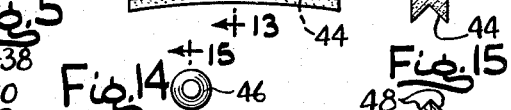
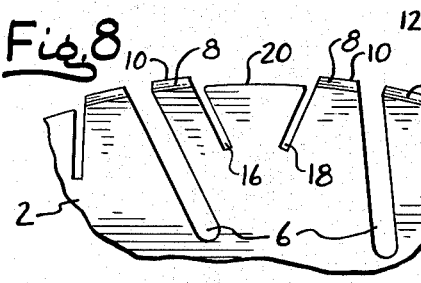
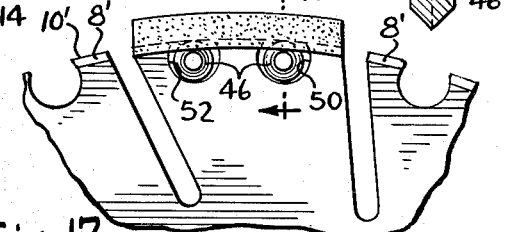
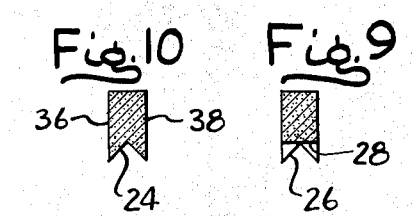
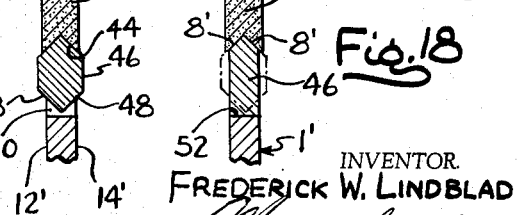
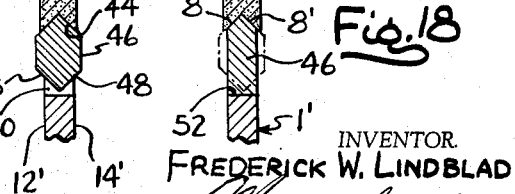
INVENTOR.
FREDERICK W. LINDBLAD
BY
ATTYS.

United States Patent Office 3,221,728
Patented Dec. 7, 1965

3,221,728
CIRCULAR SAW
Frederick W. Lindblad, 835 Illinois Ave., Aurora, Ill.
Filed Feb. 19, 1963, Ser. No. 259,551
11 Claims. (Cl. 125—15)

The present application is a continuation-in-part of my co-pending application, Serial No. 106,789, filed May 1, 1961, now Patent No. 3,146,561, dated September 1, 1964.

This invention relates to circular saws of the kind used for sawing hard material such as concrete, granite, or the like.

Saws of the kind in which the present invention is concerned, generally consist of a disc, such as a hardened and tensioned steel disc, to which are soldered or brazed pre-formed segments of abrasive material, as for instance, diamond particles embedded in a suitable matrix of metal. The disc is usually heat treated in order to give it strength and tension, enabling it to operate effectively at high speeds. However, one of the difficulties in securing the abrasive segments onto the steel disc by brazing or soldering lies in the fact that the heat of soldering or brazing tends to destroy the heat treatment of the disc and to set up objectionable stresses, both of which reduce the strength and life of the saw.

It is an object of the present invention to provide a saw in which the abrasive segments are securely fixed to the periphery of the disc in a novel manner so as to reduce as much as possible forces tending to move the segments relative to the disc.

It is also an object of the present invention to provide a saw of the type stated in which the segments are bonded to the periphery of the disc at mutually engaging counterpart surfaces. The area of engagement is increased to obtain a strong adhesive bond between the segments and disc, and, furthermore, the counterpart surfaces are of such shapes that the centering and aligning of the segments with respect to the disc is easily accomplished.

It is a further object of the present invention to provide a saw of the type stated in which, in addition to the adhesive bond between the counterpart surfaces of the segment and the disc, locking elements are secured to the segments and disc at recesses in the disc at the periphery thereof to assist in preventing radial retraction from or peripheral movement of the segments on the disc. In one form of the invention, the locking elements are formed by a U-shaped wire that is secured to each segment and is forced into the disc recesses to clinch the segments to the disc; in another form of the invention the locking elements are bead-like rivets that are inserted into the disc recesses and are mechanically staked or peened over to secure them rigidly in the recesses. Adhesive may also be used to assist in the securing of the locking elements in the recesses.

It is an additional object of the present invention to provide a saw of the type stated in which the abrasive segments can be assembled with the disc by cold bonding or without the application of appreciable heat, less than the annealing temperature of the hardened and tensioned steel disc, thereby eliminating the danger of heat distortion or destroying the effectiveness of the heat treatment of the disc. Cold bonding of the segments to the disc or bonding by application of only a small amount of heat permits the use of discs wherein it is not possible to heat solder or braze the segments thereto, as, for instance, a disc made of plastic, rubber, fiber, or other suitable non-metallic material.

It is another object of the present invention to provide the mutually engaging counterpart surfaces of such configuration that upon wear of the segments due to use of the saw, the segments will tend to approach the shape of the disc periphery, thereby permitting a more complete utilization of the segments as they become worn with use.

The attainment of the above and further objects of the present invention will be apparent from the following specification taken in conjunction with the accompanying drawing forming a part thereof.

In the drawing:

FIG. 1 is a side elevational view of a circular saw constructed in accordance with and embodying the present invention;

FIG. 2 is a top plan view thereof;

FIG. 3 is a fragmentary side elevational view, on an enlarged scale, of a portion of the saw of FIG. 1;

FIGS. 4 and 5 are fragmentary sectional views taken along lines 4—4 and 5—5 respectively of FIG. 3;

FIG. 6 is an exploded side elevational view of one of the abrasive segments and its associated locking wire, shown prior to securing the locking wire and the segment together;

FIG. 7 is a side elevational view, similar to FIG. 6, and showing the locking wire secured to the abrasive segment;

FIG. 8 is a fragmentary side elevational view, on an enlarged scale, of the disc prior to assembly of the structure of FIG. 7 therewith;

FIGS. 9 and 10 are sectional views taken along lines 9—9 and 10—10 of FIG. 6;

FIG. 11 is a fragmentary side elevational view, similar to FIG. 3, and showing a modified form of saw constructed in accordance with and embodying the present invention;

FIG. 12 is a side elevational view of one of the abrasive segments used in the saw of FIG. 11;

FIG. 13 is a sectional view taken along line 13—13 of FIG. 12;

FIG. 14 is a side elevational view of one of the rivets used in securing the segment of FIG. 12 to the disc of FIG. 11;

FIG. 15 is a sectional view taken along line 15—15 of FIG. 14;

FIG. 16 is a fragmentary side elevational view, similar to FIG. 11, and showing a step in the method of assembling the segment of FIG. 12 and rivets of FIG. 14 with the disc;

FIG. 17 is a fragmentary sectional view taken along lines 17—17 of FIG. 16; and

FIG. 18 is a fragmentary sectional view taken along line 18—18 of FIG. 11.

A saw 1 comprises a disc 2 which may be a hardened and tensioned steel member as is conventional in the art, said disc 2 including a central opening 4 or other conventional means for mounting the disc on an arbor of a motor driven saw. At its outer periphery the disc 2 has a series of slots 6 for cooling and swarf clearance. In this instance there are twenty-four such slots uniformly spaced around the perimeter of the disc 2. The disc 2 may also be made of plastic, rubber, fiber, or other suitable material.

At its outer periphery the disc 2 is tapered as indicated at 8, 8 to a point 10 which forms an annular ridge centered between the side faces 12 and 14 of the disc 2.

Intermediate the slots 6, the disc 2 is formed with pairs of recesses 16, 18 that extend from the periphery of the disc 2 inwardly and toward one another. The recesses 16, 18 also occupy the full width of the disc 2. Between each pair of recesses 16, 18 the tapered portion 8, 8 is cut away to provide a cylindrical surface 20.

Twenty-four identical cutting segments 22, each preferably greater in width than the width of the perimetral part of the disc 2, are assembled around the edge of the disc 2. Each of the segments 22 is preferably a diamond cutting segment of compositions known in the art and includes diamond abrasive particles embedded in a suitable metal. The bottom surface of each segment 22 has longitudinally spaced V-shaped grooves 24, 26 therein which are each of a shape that is the counterpart of the surfaces 8—8 at the periphery of the disc 2. Intermediate the grooved portions 24, 26, each segment has a notch 28 to which is bonded, as by brazing or other conventional manner, a U-shaped wire 30 that may be of square cross section, as shown, or may be of oblong cross section. The bight of the wire 30 is of a length approximately the same as that of the notch 28, and the tines 32, 34 of the wire project radially inwardly from the segment and are spaced apart a distance approximately equal to the distance between the peripheral mouths of the recesses 16, 18, as appears by reference to FIGS. 7 and 8.

After each segment 22 and its associated wire 30 are assembled together (FIG. 7), that assembly is placed over the periphery of the disc 2 so that the tines 32, 34 of the wire 30 fit into the peripheral mouths of the recesses 16, 18. As the segment 22 is mechanically forced radially inwardly, the tines 32, 34 extend further into the recesses 16, 18 causing them to clinch the disc 2. The segment 22 is pushed radially inwardly until the grooved portions 24, 26 seat on the counterpart surfaces 8, 8. The counterpart surfaces 24, 8—8 and 26, 8—8 are secured together by an interposed bonding film of a suitable adhesive, for example, an epoxy resin adhesive. This adhesive may, if desired, be applied to adhere the tines 32, 34 in place within the recesses 16, 18.

The foregoing construction locks the segments 22 to disc 2 against lateral motion and the clinching action of the wire tines 32, 34 locks the segments 22 against radial retraction or circumferential movement on the disc 2.

The V-shaped grooves 24, 26 at the bottom of the segments 22 are centered between the segment side faces 36 and 38 which are in planes parallel to the planes of the opposite sides 12, 14 of the disc 2. This insures that the segments 22 are centered on the disc 2 during assembly therewith. During use, as the segments 22 wear, they tend to wear down to shapes such as is indicated at dotted line 40 (FIG. 5) which is a shape approximating the surfaces 8, 8.

It is to be noted that the surfaces 8, 8 provide a large area of contact between the periphery of the disc 2 and the segments 22. This area may be substantially increased by making the surfaces 8, 8 at a more acute angle to one another. Moreover, each of the segments 22 is arcuate at its outer edge 42 along a circle whose center is the center of the disc 2.

When the segments 22 are secured to the disc 2 by a film of epoxy resin, it is not necessary to apply appreciable heat to the disc 2 or to the segments 22 as part of the step of securing them together. This eliminates the risk of heat distortion, undesirable stresses, or the like during assembly of the saw. Moreover, a disc 2 of fiber, rubber, plastic, etc., may be used since soldering or brazing and the heat thereof are eliminated in the assembly of the disc and segments.

A modified form of saw 1' is shown in FIGS. 11–18 in which like reference numerals with a prime added indicate parts corresponding to the parts of the saw 1 of FIGS. 1–10. In the saw 1' each segment 22' has a V-shaped groove 44 at its inner periphery and in that groove there is brazed or otherwise secured two spaced apart bead-like rivets 46, 46. Each of the rivets 46 have tapered surfaces 48, 48 that mate with the surfaces forming the V-groove 44 to insure a large area of bonded contact of the rivets 46 with the segments 22'. Moreover, each rivet 46 is somewhat wider than the disc 2', and at least as great as the thickness of the segment 22', as seen in FIG. 17, and for purposes presently more fully appearing.

The disc 2' has pairs of recesses 50, 52 between the swarf clearance slots 6'. These recesses 50, 52 are of generally circular shape and each has a width, at the periphery of the disc 2', that is slightly greater than the diameter of the rivets 46, 46. Moreover, the centers of the recesses 50, 52 preferably lie below the periphery of the disc 2' an amount less than the radius of each rivet, and each recess 50, 52 has a maximum diameter that is greater than the diameter of each rivet 46.

The segments 22' with the rivets 46 assembled therewith are placed over the periphery of the disc 2 so that the surfaces forming the V-groove 44 seat upon the counterpart surfaces 8', 8' of the disc 2' and the rivets 46, 46, enter the recesses 50, 52, as shown in FIGS. 16 and 17. The counterpart surfaces are bonded together by an epoxy resin or other suitable adhesive.

Each rivet 46 is then mechanically staked or peened to increase its diameter from the dotted to full line positions, as shown in FIG. 18, to fill or approximately fill the recesses 50, 52. The thickness of the rivets 46 will be reduced to that approximating that of the width of the disc 2'.

The counterpart V-surfaces of the segments 22' and disc 2' center the segments on the disc and also prevent relative axial movement of the segments 22' and disc 2'. The adhesive also assists in preventing circumferential movement of the segments 22'. The rivets 46 prevent radial retraction of the segments 22' and also circumferential movement of the segments 22'.

Like the saw of FIGS. 1–10, the saw of FIGS. 11–18 does not require appreciable heating and hence does not impair a hardened and tensioned steel disc. Also, the construction and method of FIGS. 11–18 may be in connection with fiber, rubber, plastic and other non-metallic discs.

In compliance with the requirements of the patent statutes, there has been shown preferred embodiments of the present invention. What is considered new and sought to be secured by Letters Patent is:

1. A saw comprising a circular disc having a reduced thickness peripheral portion and circumferentially spaced recesses at its periphery that extend inwardly therefrom, a cutting edge comprising arcuate segments that include diamond abrasive particles embedded in a matrix, said segments surrounding the periphery of the disc and each having a notch portion which is a counterpart of and fits over the reduced thickness peripheral portion of the disc, the counterpart surfaces of the disc and segments being of a shape to align the segments on the disc and center them between opposite sides of the disc, a bonding film interposed between said counterpart surfaces for rigidly securing the segments to the disc, each segment being of an axial thickness geater than that of the disc adjacent to but spaced from said reduced peripheral edge portion, and means secured to the segments and the disc and lying within the recesses and providing deformed mechanically interlocked radially and peripherally interfering surfaces therebetween and operable in addition to said bonding film for retaining each segment against peripheral and circumferential movement on the disc.

2. A saw comprising a circular disc having circumferentially spaced recesses at its periphery that extend inwardly therefrom, a cutting edge comprising arcuate segments that include diamond abrasive particles embedded in a matrix, said segments surrounding the periphery of the disc and each having a surface contour portion which is a counterpart of and fits over a surface contour portion of the peripheral part of the disc with an adhering bonding film interposed between said counterpart surfaces for rigidly securing the segments to the disc, each segment being of an axial thickness greater than that of the disc adjacent to but spaced inwardly from said periphery of the disc, the portions of the disc and segments having the counterpart surfaces radially telescoping to prevent lateral movement of the segments on the disc and said counterpart surfaces being of a shape such that the segments will wear down approximately to said shape, and means comprising radially inwardly projecting members rigidly secured to radially inwardly presented parts of the segments, said members extending into said recesses and being deformed to provide mechanically interlocked radially and peripherally interfering surfaces therebetween and operable in addition to said bonding film for securing the segments against peripheral and circumferential movement on the disc.

3. A saw comprising a circular disc having peripheral edge means V-shaped in cross section with the apex of the V pointing radially outwardly of the disc, said disc having circumferentially spaced recesses extending inwardly from its peripheral edge, a cutting edge comprising arcuate segments that include diamond abrasive particles embedded in a matrix, said segments surrounding the periphery of the disc and each having V-shaped groove means which is a counterpart of and fits over the V-shaped edge means of the disc with an interposed adhering bonding film, each segment being of an axial thickness greater than that of the disc adjacent to but spaced from the perimeter thereof, and deformable means secured to each segment and the disc and lying within the recesses and being deformed to provide mechanically interlocked radially and peripherally interfering surfaces therebetween and operable in addition to said bonding film for securing each segment against peripheral and circumferential movement on the disc.

4. A saw according to claim 2 wherein the last-named means includes wire means secured to each segment and having portions thereof force-fitted into the recesses.

5. A saw according to claim 2 wherein the last-named means includes bead-like members secured to each segment and fitting into the recesses and being mechanically staked therein.

6. A saw according to claim 1 wherein the disc is hardened and tensioned metallic member, and the bonding film is of a material that bonds at a temperature below the annealing temperature of the disc.

7. A saw according to claim 1 wherein the disc is of a non-metallic material.

8. A saw according to claim 3 wherein the disc is hardened and tensioned.

9. A saw according to claim 3 wherein the disc is of a non-metallic material and the bonding film bonds said counterpart surfaces at a temperature below the melting point of the disc material.

10. A saw comprising a circular disc having circumferentially spaced recesses extending inwardly from said peripheral edge, a cutting edge comprising arcuate segments that include diamond abrasive particles in a matrix, said segments surrounding the periphery of the disc and each having a surface contour that is a counterpart of and fits over the surface of the peripheral part of the disc, the counterpart surfaces of the disc and segments radially telescoping and cooperating to prevent lateral movement of the segments on the disc, an adhering bonding film interposed between said counterpart surfaces for rigidly securing the segments to the disc, and bead-like members secured to the radially inwardly presented part of each segment and fitting into the recesses and being mechanically deformed and staked therein and operable in addition to said bonding film to secure each segment against peripheral and circumferential movement.

11. A saw comprising a circular disc having a plurality of pairs of circumferentially spaced recesses at its periphery that extend inwardly therefrom at an angle to each other, a cutting edge comprising arcuate segments that include diamond abrasive particles embedded in a matrix, said segments surrounding the periphery of the disc and each having longitudinally spaced pairs of surface contour portions which are respectively counterparts of and fit over circumferentially spaced pairs of surface contour portions of the peripheral part of the disc, one pair of said recesses being intermediate each pair of surface contour portions of the disc, the counterpart surfaces of the disc and segments radially telescoping and cooperating to prevent lateral movement of the segments on the disc, an adhering bonding film interposed between said counterpart surfaces for rigidly securing the segments to the disc, the radially inwardly presented surface of each segment intermediate said longitudinally spaced surface contour portions thereof having a radially inwardly opening notch, and means in addition to said bonding film and comprising a wire secured to each segment in its notch and having elements that extend into the associated pair of recesses for securing each segment against peripheral and circumferential movement on the disc.

References Cited by the Examiner
UNITED STATES PATENTS

| | | | |
|---|---|---|---|
| 2,808,044 | 10/1957 | Upper et al. | 125—15 |
| 2,815,746 | 12/1957 | Schwarzkopf et al. | 51—206 |
| 2,830,474 | 4/1958 | Brauchler | 76—112 |
| 2,856,798 | 10/1958 | Watson | 76—112 |
| 2,913,858 | 11/1959 | Praeg et al. | 51—206 |
| 3,016,661 | 1/1962 | Nielsen | 51—206 |
| 3,036,567 | 5/1962 | Biesanz | 125—15 |
| 3,081,661 | 3/1963 | MacPherson | 51—206 X |
| 3,122,030 | 2/1964 | Metzger | 51—206 |

LESTER M. SWINGLE, *Primary Examiner.*

JOHN C. CHRISTIE, HAROLD D. WHITEHEAD, *Examiners.*